E. N. WARD & C. D. GUFFEY.
GLASS TUBE CUTTER.
APPLICATION FILED MAR. 11, 1909.
934,487.
Patented Sept. 21, 1909.
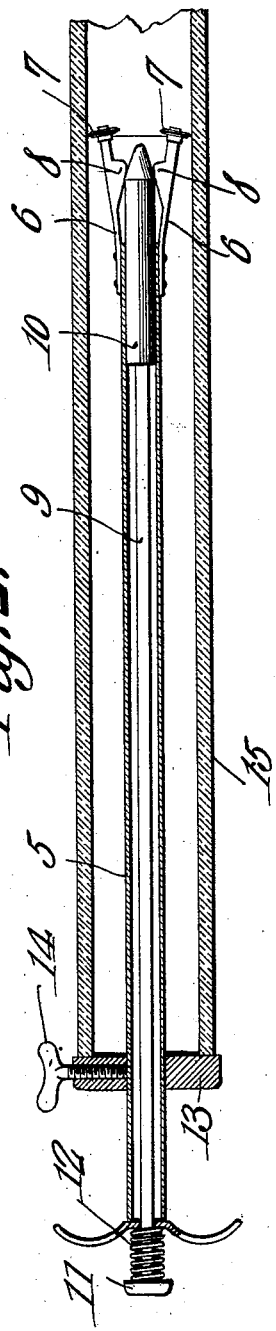
Witnesses
Inventors
Ernest N. Ward and
Claudis D. Guffey
By C. A. Snow & Co.
Attorneys

UNITED STATES PATENT OFFICE.

ERNEST NOBLE WARD AND CLAUDIS DOW GUFFEY, OF BAXTER SPRINGS, KANSAS, ASSIGNORS OF ONE-THIRD TO CHARLES M. JONES, OF BAXTER SPRINGS, KANSAS.

GLASS-TUBE CUTTER.

934,487.  Specification of Letters Patent.  Patented Sept. 21, 1909.

Application filed March 11, 1909. Serial No. 482,713.

*To all whom it may concern:*

Be it known that we, ERNEST NOBLE WARD and CLAUDIS DOW GUFFEY, citizens of the United States, residing at Baxter Springs, in the county of Cherokee and State of Kansas, have invented a new and useful Glass-Tube Cutter, of which the following is a specification.

This invention relates to that class of glass tube cutters characterized by retractile cutting devices which engage and cut the tube from the interior walls thereof; and the object of the present invention is to provide a tool of this kind which is simple in structure, and which can be easily operated, and also to provide improved means for advancing and retracting the cutting devices.

With the foregoing objects in view the invention consists in a novel construction and arrangement of parts to be hereinafter described and claimed, reference being had to the drawing hereto annexed forming a part of this specification, in which drawing—

Figure 1 is a side elevation of the tool, with the cutting devices in retracted or inoperative position. Fig. 2 is a central longitudinal sectional view of the tool showing the cutting devices advanced and in position for operation, the tool being shown within a glass tube ready for operation thereon.

In the drawing 5 denotes a tube of suitable length which forms the shank of the tool. To one end of said tube are secured resilient arms 6 which carry at their extremities cutters 7, the latter being in the form of hardened steel rollers formed with a peripheral cutting edge. The inner sides of the arms 6 are formed with shoulders or abutments 8 which are for a purpose to be presently described.

Extending lengthwise through the tube 5 is a rod 9 which carries at one end a block 10 which is wedge-shaped at its outer end, said end being adapted to enter between the arms and to engage the shoulders 8, whereupon said arms are spread laterally in opposite directions to bring the cutting wheels 7 into contact with the inner wall of the tube which is to be cut. Upon withdrawing the block 10 from the shoulders 8 the arms 6 spring back to their normal position, and the cutting wheels are disengaged from the tube. The block 10 is operated by pushing the rod 9 forwardly, said rod for this purpose, projecting a suitable distance from the butt end of the tubular shank 5, and being provided with a head 11. Between this head and the adjacent end of the shank, a spring 12 is coiled around the rod.

On the tubular shank 5 is adjustably mounted a gage collar 13 which is held at adjustment by a set screw 14, and is for the purpose of gaging the length of the portion to be cut off the tube.

In the operation of the device, the gage collar 13 is set according to the length of the tube to be cut, and that end of the tubular shank 5 carrying the cutting wheels 7 is inserted into the glass tube 15 until the collar 13 abuts against the end thereof as shown in Fig. 2. In this position the cutting wheels will be opposite the point at which the cut is to be made in order to obtain a tube of the required length. The rod 9 is then pushed forwardly which advances the block 10 and causes its wedge-shaped outer end to engage the shoulders 8, whereupon the arms 6 spread and bring the cutting wheels 7 into contact with the inner wall of the tube. The device is then rotated one or more turns to cut the tube sufficiently to allow it to be easily separated. Upon releasing the rod 9 the spring 12 retracts the same and withdraws the block from between the arms 6, whereupon they spring back to their normal position and carry the cutters away from the wall of the tube.

The device herein described is simple in construction and therefore can be cheaply produced, it is rapid in operation, can be readily adjusted to cut off tubes of different lengths, and it effectually serves the purpose for which it is designed.

What is claimed is:

A glass tube cutter comprising a tubular shank, diametrically opposite resilient arms fixed to the shank and projecting from one end thereof, oppositely disposed shoulders formed on the projecting ends of the arms, cutters carried by the arms, a wedge slidably mounted in the tube, and adjustable to project therefrom and engage the shoulders of the arms to wedge the same, and means for operating the wedge.

In testimony that we claim the foregoing as our own, we have hereto affixed our signatures in the presence of two witnesses.

ERNEST NOBLE WARD.
CLAUDIS DOW GUFFEY.

Witnesses:
JAMES L. HARMAN,
J. W. GRAUTHAM.